(12) United States Patent
LittleSun et al.

(10) Patent No.: US 12,002,274 B2
(45) Date of Patent: Jun. 4, 2024

(54) GAMIFIED ALPHANUMERIC CHARACTER IDENTIFICATION

(71) Applicant: Electronic Transaction Consultants, LLC, Richardson, TX (US)

(72) Inventors: Joshua LittleSun, Plano, TX (US); Thomas J. Owen, Haltom City, TX (US); Benjamin McCord, McKinney, TX (US); Scott Cote, Allen, TX (US)

(73) Assignee: ELECTRONIC TRANSACTION CONSULTANTS, LLC, Richardson, TX (US)

( * ) Notice: Subject to any disclaimer, the term of this patent is extended or adjusted under 35 U.S.C. 154(b) by 137 days.

(21) Appl. No.: 17/410,271

(22) Filed: Aug. 24, 2021

(65) Prior Publication Data

US 2022/0058415 A1 Feb. 24, 2022

Related U.S. Application Data

(60) Provisional application No. 63/069,503, filed on Aug. 24, 2020.

(51) Int. Cl.
*G06V 30/199* (2022.01)
*A63F 13/46* (2014.01)
*A63F 13/80* (2014.01)
*G06F 18/21* (2023.01)
*G06V 20/62* (2022.01)
*G06V 30/148* (2022.01)

(52) U.S. Cl.
CPC ............ *G06V 30/199* (2022.01); *A63F 13/46* (2014.09); *A63F 13/80* (2014.09); *G06F 18/2178* (2023.01); *G06V 20/62* (2022.01); *G06V 20/625* (2022.01); *G06V 30/153* (2022.01)

(58) Field of Classification Search
CPC .... G06V 30/199; G06V 20/62; G06V 30/153; G06V 20/625; A63F 13/46; A63F 13/80; G06F 18/2178
See application file for complete search history.

(56) References Cited

U.S. PATENT DOCUMENTS

| | | | |
|---|---|---|---|
| 6,473,517 B1* | 10/2002 | Tyan | G06V 30/153 382/105 |
| 2014/0355835 A1* | 12/2014 | Rodriguez-Serrano | G06V 20/63 382/105 |
| 2015/0278619 A1* | 10/2015 | Pakhchanian | G06F 18/2178 382/310 |
| 2016/0300119 A1* | 10/2016 | Silva | G06F 16/248 |
| 2017/0061225 A1* | 3/2017 | Mitchell | G06Q 20/3223 |
| 2017/0249524 A1* | 8/2017 | Bulan | G06F 18/295 |
| 2017/0372161 A1* | 12/2017 | Almeida | G06V 10/811 |

* cited by examiner

*Primary Examiner* — Amandeep Saini
*Assistant Examiner* — Daniella M. DiGuglielmo
(74) *Attorney, Agent, or Firm* — Haynes and Boone, LLP

(57) ABSTRACT

A method includes receiving from a first detection system, an image of a license plate, applying an optical recognition function to characters of the license plate, and assigning a confidence value to each of the characters. The method further includes, in response to determining that the confidence value for a particular character is below a threshold, sending an image of the character to a gamified human reviewer application, receiving from the gamified human reviewer application, a human response indicative of a characteristic of the character, and updating the optical recognition function based on the characteristic of the character.

20 Claims, 5 Drawing Sheets

GAMIFIED ALPHANUMERIC CHARACTER IDENTIFICATION

PRIORITY INFORMATION

This application claims priority to Provisional Patent Application No. 63/069,503 filed Aug. 24, 2020, the disclosure of which is hereby incorporated in its entirety.

BACKGROUND

Conventional methods for collecting tolls on tollways typically involve issuing Radio Frequency Identification (RFID) Tags (a.k.a. toll tags) to users. The users then place these toll tags in their vehicles. When the vehicles pass through a toll tunnel, a toll tag reader within the tunnel detects the toll tag. The account associated with that toll tag can then be billed accordingly. In some examples, additional techniques may be used, such as taking pictures of license plates and applying an Optical Character Recognition function on the picture to read the license plate number. While these algorithms are fairly accurate, there may often be situations where one or more characters is difficult to read.

SUMMARY

According to one example, a method for verifying individual characters on a license plate via human reviewers includes receiving an image of a license plate from a first detection system, applying an optical recognition function to characters of the license plate, assigning a confidence value to each of the characters, sending an image of the character to a gamified human reviewer application in response to determining that the confidence value for a particular character is below a threshold, receiving a human response indicative of a characteristic of the character from the gamified human reviewer application, and updating the optical recognition function based on the characteristic of the character.

In one example, a method includes receiving a plurality of character images from a license plate recognition system, each character image comprising a single character from an image of a license plate. The method further includes presenting the plurality of character images to a user in a gamified manner; presenting the user with information regarding the user's performance of identifying the character; receiving from the user, an identification of the character and characteristics of the character, and returning the identification and the characteristics to the license plate recognition system.

In one example, a system includes a processor and a memory comprising machine readable instructions that are executed by a processor. The system receives an image of a license plate from a detection system, applies an optical recognition function to characters of the license plate and assigns a confidence value to each of the characters. The system sends an image of the character to a gamified human reviewer application in response to determining that the confidence value for a particular character is below a threshold. The system then receives a human response indicative of a characteristic of the character from the gamified human reviewer application and updates the optical recognition function based on the characteristic of the character.

DETAILED DESCRIPTION

Brief Description of the Drawings

The present disclosure is best understood from the following detailed description when read with the accompanying figures.

DESCRIPTION

Figure 1:
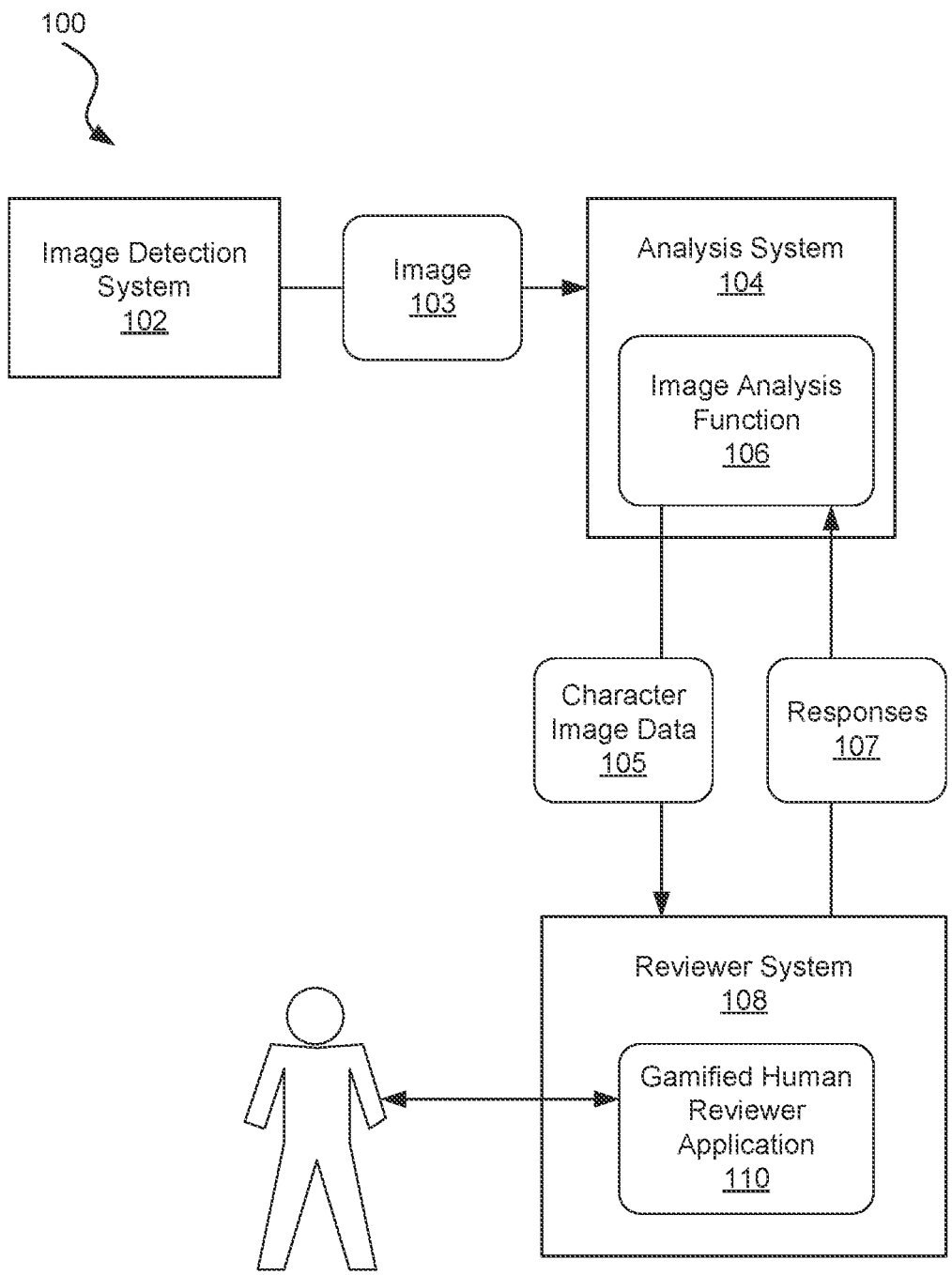
FIG. 1 is a diagram showing an illustrative character identification system, according to one example of principles described herein.

The following disclosure provides many different embodiments, or examples, for implementing different features of the invention. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

In some cases, where license plates from images may be difficult to identify, a human reviewer may need to verify one or more characters. It is desirable to carry out this human identification process as efficiently as possible. Moreover, it is desirable to improve the character identification functions so as to rely less on human reviewers. According to principles described herein, human reviewers for character identification also provide information to the character recognition function, which can then use that information to improve the effectiveness of that character recognition function.

The principles described herein relate to a Gamified Alphanumeric Labeler (GAL) that displays images of individual letters collected by an Automatic License Plate Reader (ALPR) for review and labeling by a human reviewer (reviewer) in a personalized environment. The reviewer may be presented with a series of images and then select the best matched alphanumeric character for each image. If the displayed image has an unreadable alphanumeric, or lacks a character, then the reviewer may reject the image by pressing or stating any one of one or more codes/phrases that best describes the reason for the rejection. Supplemental rejection information may be included via typing or voice-to-text (V2T) by the reviewer.

To incentivize the speed and accuracy of the reviewer's work, the GAL displays a score associated with the user's current performance. The reviewer's score may be directly proportional to the rate of character review (while factoring in errors detected by a second reviewer). To help the user achieve higher scores, the interface provided to the user may be customizable to the user's preferences. In other words, configuration of the screen may be constructed on a reviewer by reviewer basis to achieve the maximal score for each particular reviewer. Configuration may include, among other things, arrangement and observability of screen widgets, personally trained V2T sound profiles for the speakers pronunciations of known phrases, terms and characters, and display of icons and badges heralding goals and achievements. In order maintain V2T accuracy, edits (self-edits or a secondary review) that corrects a mistake made in a review may trigger an evaluation of the V2T interpretation of the primary reviewer's identifications of characters if enough mistakes occur (in order to correct for interpretation drift).

Conventional license plate reviewer systems ascertain the value of all single letter (labels) within a given license plate. If the statistics gathered during the reading show a probability for error that exceeds an acceptable threshold, then the image of the plate is sent to our Human License Plate Reviewers (HLPR) Client (Client) in order to display the entire plate to the reviewer. Then the reviewer will label the entire plate, regardless of the image quality of any individual letters.

However, according to the principles described herein, the GAL is used to improve the efficiency of reviewers by instead of displaying a whole plate for complete entry (every letter needs to be entered), the GAL only displays the letters where the ALPR calculated a low confidence value. For a given plate image, fewer letters to review implies less entries to be performed by humans therefore increasing the number of problematic plate images that may be reviewed by reviewers. The GAL feeds the results back into a confidence model to allow improvements to the ALPR reading accuracies.

For example, the GAL may receive feedback from unrecognizable characters that specify the reason why a particular character is difficult to recognize. For example, the list of reasons may include: too dark, too light, blurry, obstructed, or other possible reasons. The GAL may take this feedback to improve its character recognition functions. For example, if a particular character is identified by human reviewers as too dark, then future images with similar qualities may have the brightness or contrast adjusted and the OCR reapplied to see if a higher confidence identification can occur. In some examples, a user may still be able to identify a character even though it is dark, blurry, or whited out. In such case, the user may provide both an identification, and a reason for why the character likely has a low confidence score from the OCR function. This information can be used to help tune the OCR and improve performance.

Through principles described herein, the process of identifying alphanumeric characters from images can be improved. Specifically, by collecting information from human viewers as to the reason why images are either unidentifiable or have low confidence scores allows the image analysis function to be improved. Further, by setting up the graphical user interface to be customizable as described, human reviewers are able to more effectively identify characters.

FIG. 1 is a diagram showing an illustrative character identification system 100. The character identification system 100 includes an image detection system 102, an image analysis system 104, and a reviewer computing system 108.

The image detection system 102 may be, for example, a set of cameras placed along a roadway and configured to capture images of license plates of vehicles passing by. While the example described throughout this specification will be for license plate detection, it is understood that other forms of image detection where character recognition is desired may be used as well. The image detection system 102 is configured to detect an image 103. The image detection system 102 then sends the image data for that image 103 to the analysis system 104 over a network.

The analysis system 104 may act as the Automatic License Plate Reader (ALPR) described above. The analysis system 104 is responsible for analyzing the images to identify characters within the image 103 represented by image data. The analysis system 104 may be geographically separate from the image detection system 102 and is in communication with the image detection system 102 over a network such as the Internet. The analysis system 104 may apply an image analysis function 106 to the image data 103 to identify the characters within the image data. For example, the analysis function 106 may identify each of the characters of a license plate within the image 103.

For each identified character, the image analysis function 106 assigns a confidence score. The confidence score is a value that describes how confident the function is that the identified character is correct. If that confidence score is higher than a particular threshold, then no human review is necessary. The analysis system 104 thus uses the character identified by the image analysis function 106 as the identified character.

If, however, the image analysis function 106 determines that the confidence score is below the threshold, then the image analysis function determines that that character should be sent to a human reviewer. Thus, the analysis system 104 sends the character image data 105 over a network to the reviewer system 108. The character image data 105 may be a portion of the image 103 that corresponds to only the character to be identified, without the rest of the image data. In some examples, however, the character image data may include the entire image 103 along with data that references the portions of the image that correspond to the character to be reviewed by a human reviewer.

The human reviewer system 108 corresponds to the HLPR client described above. The human reviewer system 108 includes a gamified human reviewer application 110. That application 110 is designed to present a graphical user interface (GUI) to a user in which an image of the character to be identified is displayed. In some examples, the reviewer system corresponds to a user's laptop or desktop computer that is running the gamified human reviewer application. In some examples, the reviewer system corresponds to a mobile or tablet device that runs the gamified human reviewer application 110.

Through the GUI of the application 110, the user can input, through a variety of mechanisms, the letter or number that the user believes to be depicted in the image. In addition to identifying the character, the user may also provide a reason why he or she believes the character received a low confidence score. For example, the user may indicate that the character is too light compared to the background, too dark compared to the background, or partially obstructed. Other reasons are contemplated as well.

The user's responses 107, both the identified character and reasons for why the character is difficult to identify, may be sent back to the image analysis function of the analysis system 104. The image analysis function may then designate the character identified as the user as corresponding to that character image. In some examples, the image analysis function 106 may send the character image data 105 to multiple human reviewers, each using a different reviewer system 108. The image analysis function 106 may designate the character selected by a majority of the human reviewers as the character for the relevant character image. The identified character can then be used with all the characters in the image 103 to identify a complete license plate or other alphanumeric word. The analysis system 104 may then provide the complete license plate to systems that make use of it, such as for tolling purposes.

In addition to identifying the characters based on human feedback, the image analysis function 106 may update its analysis functions based on the reasons that were provided by the users. For example, through machine learning and other big data management techniques, the image analysis function 106 may determine that certain types of images are too light compared to the background, and that by adjusting a contrast of the image, such characters can be identified with higher confidence scores, and thus not require the use of human reviewers.

Figure 2A:
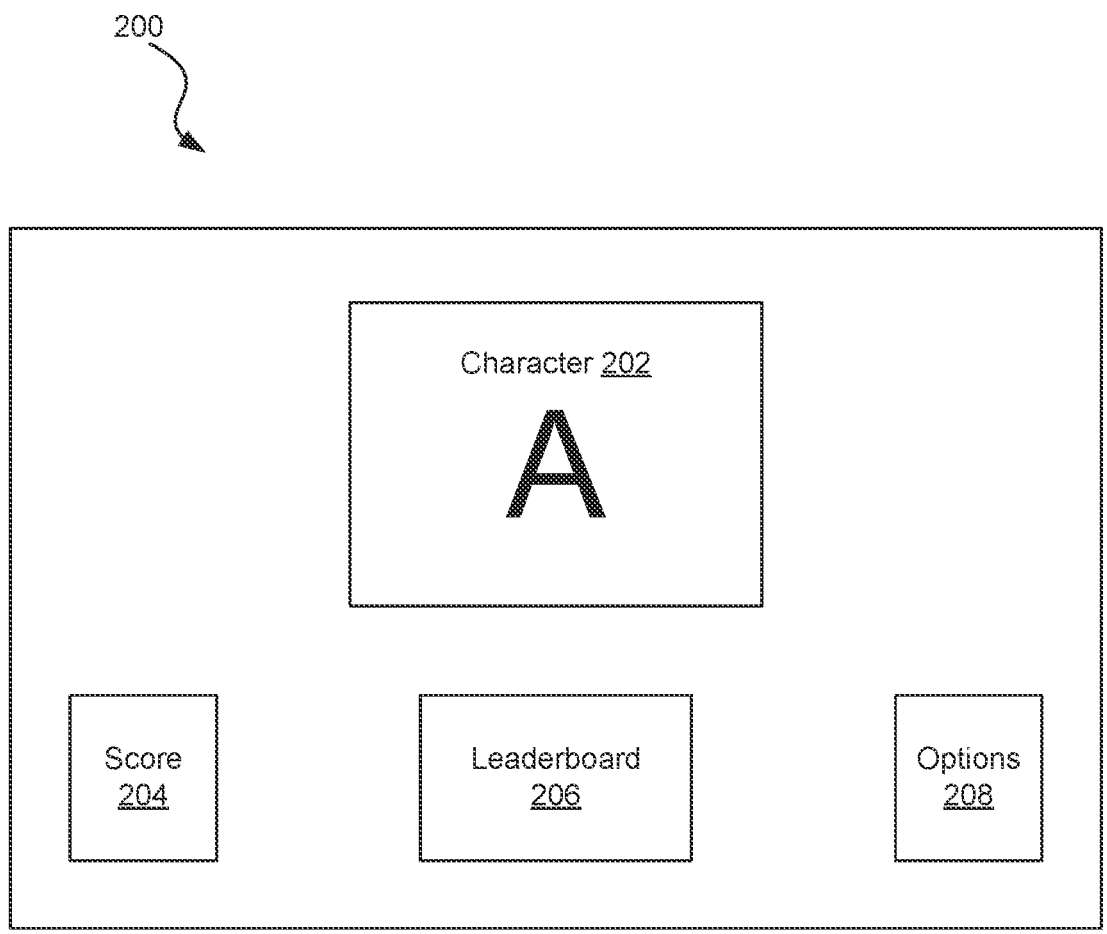
FIGS. 2A and 2B are diagrams showing an illustrative graphical user interface for a gamified alphanumeric identification application, according to principles described herein.
Figure 2B:
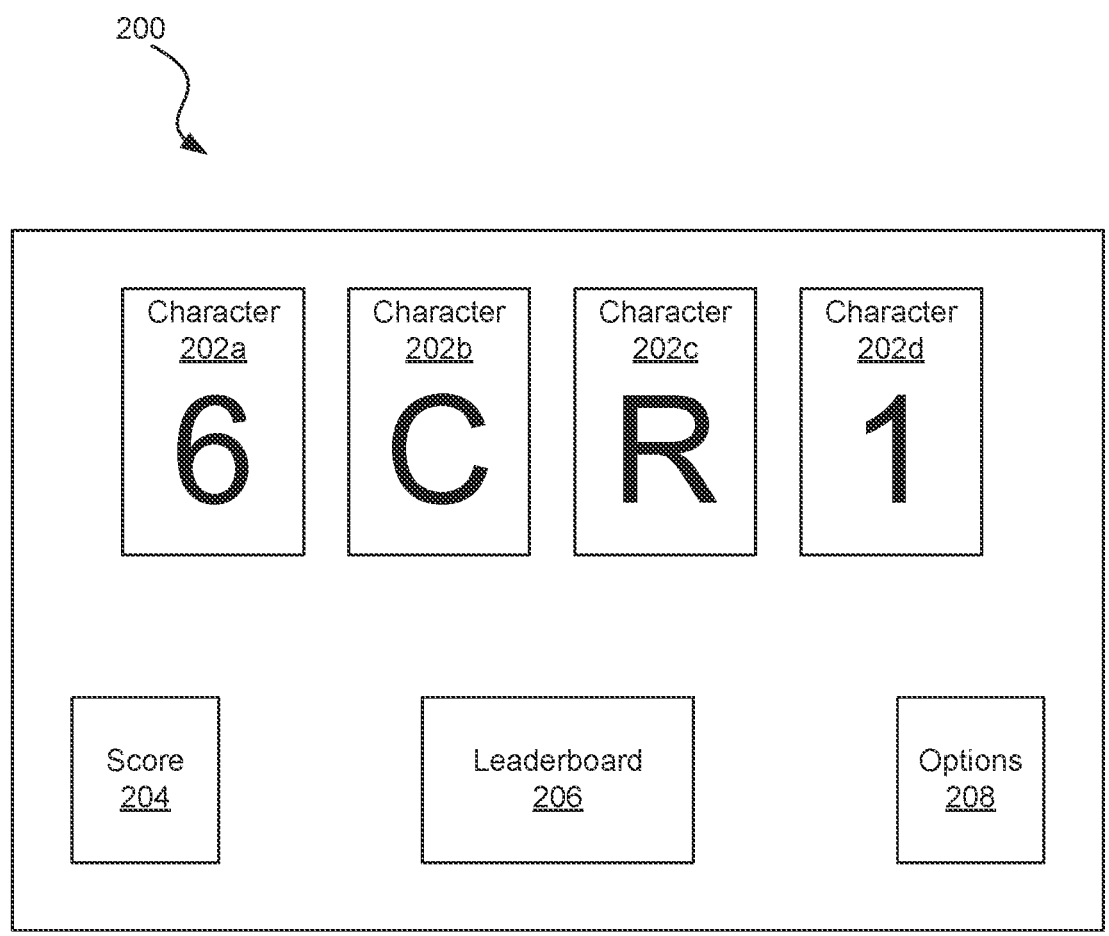

FIGS. 2A and 2B are diagrams showing an illustrative graphical user interface 200 for a gamified alphanumeric identification application (e.g., 110, FIG. 1). According to the present example, the GUI 200 displays the character 202 to be identified, a score 204 for the user, a leaderboard 206, and an options panel 208. FIG. 2A illustrates an example in which a single character 202 is displayed on screen. When the user identifies that character, a new character is then solely displayed for the user to identify. FIG. 2B illustrates an example in which multiple characters 202a, 202b, 202c, 202d are displayed simultaneously. After the user identifies each of the characters 202a, 202b, 202c, 202d, a new set of characters can then be displayed for the user to identify.

The character 202 may be displayed to the user in a variety of ways. In one example, only the character 202 to be identified is displayed to the user. In other words, the user sees only a small portion of the entire license plate image that corresponds to the character to be identified. In some examples, the entire license plate may be shown to the user, with an indicator overlaid on the image to show which character the user should identify. In some cases, all the characters in the license plate that are not being identified by the user are obstructed, grayed out, whited out, or blacked out. This may be done for security reasons, as no one will see the whole license plate. Depending on the configuration of the reviewer (and settings allowed by management) the reviewer would not have access to the whole plate if the "context" view of the letter was either removed, "shrunk", or obscured by management. Removed means that the complete image of the license plate is not delivered to the application. Shrunk means a truncated image of the license plate is provided where the boundary area around the letter is expanded, but to not include the entire plate. Obscured means that the rectangle covering the letter is clear, as is a supplemental region bounding the covering rectangle, but the remainder of the plate is blurry and unreadable.

The score 204 is a numerical representation of the user's performance. The score 204 may be calculated in a variety of manners. In one example, the score 204 is calculated as characters identified per unit of time (e.g., X characters per minute or X characters per hour). The score may also be calculated as the total number of characters identified within a time window (e.g., X characters this session, X characters this day, X characters this week, etc.). In some cases various different scores may be displayed.

The leaderboard 206 may show the user the scores of other users who are using the gamified alphanumeric identification application. In some examples, the user's score may be presented along with other users. The list of user scores may be dynamically updated as the scores of the different users change. A feature of the principles described here is that management for the human reviewers may display a goal that could be financial (or non-financial) for the reviewer and the reviewer's teammates. The goals could be established for a variety of efforts—day, session, week, hour, . . . career (as well as by individual and group). For example: team member A performs at experience level X for the first two weeks. After a couple of extra training sessions with team member B, A's performance increases by a factor of 5%. B and A should be recognized. If B achieves these same goals with team members C, D, and E, then another recognition can happen (i.e. gamification for the team and the trainer).

The user may also use the options panel 208 to set several different options. For example, the user may choose different input mechanisms. The gamified alphanumeric identification application may allow for keyboard/mouse input or voice-to-text input. Either type of input may be used both for character identification and the believed reason for why the character is difficult to read. The user may also reject a character as unreadable and give a reason for the rejection. The reason for rejection, or reason for why a character is difficult to read (but still readable) may be provided through voice-to-text as a specific phrase. The system can also adapt to the user's voice-to-text input. If a character/phrase is spoken and corrected enough times (via typing either by reviewer or secondary reviewer), then system recognizes this and may triggers retraining of the voice-to-text function. Edits made by reviewer to correct a mis-review would be verbalized. For example, to correct the character in position "1" and establish the value as "z": the reviewer would state, "edit 1 set z". If the value had been "c" and the reviewer spoke "z", but was interpreted to "c", then the reviewer would state "edit 1 stated z" (thus alerting the voice to text that its not interpreting speaker correctly—the reviewers "z" sounded like a "c", and the voice-to-text should differentiate "z" from "c").

Users may also have the option to change the configuration of the screen to suit their needs via hot keys or verbal commands. Configuration of the screen is tracked along with other metadata of the session in order to aid management in the support of features of the gamified alphanumeric identification application. If a feature is not used, a quick investigation may discover that it is either not explained well or not useful. Subsequent releases can be used to add, enhance, or remove a feature. In other words, the GUI's look and feel may be configured on a reviewer by reviewer basis in order for the reviewer to achieve maximum performance score. The configuration of reviewer A may not be the best configuration for reviewer B. In some examples, characters may move horizontally or vertically across the screen, and the user may attempt to identify the character by the time that character gets to a certain point on screen. In some examples, a set of different characters from different license plates may be displayed simultaneously, and the user can identify each one in turn before a new set of characters appears on screen.

In some examples, the gamified alphanumeric identification application may include a tempo meter that displays the tempo at which the user is currently identifying characters. The tempo meter may have a target cadence for the user as well as a current cadence. This can help the user measure improvement and performance.

Figure 3:
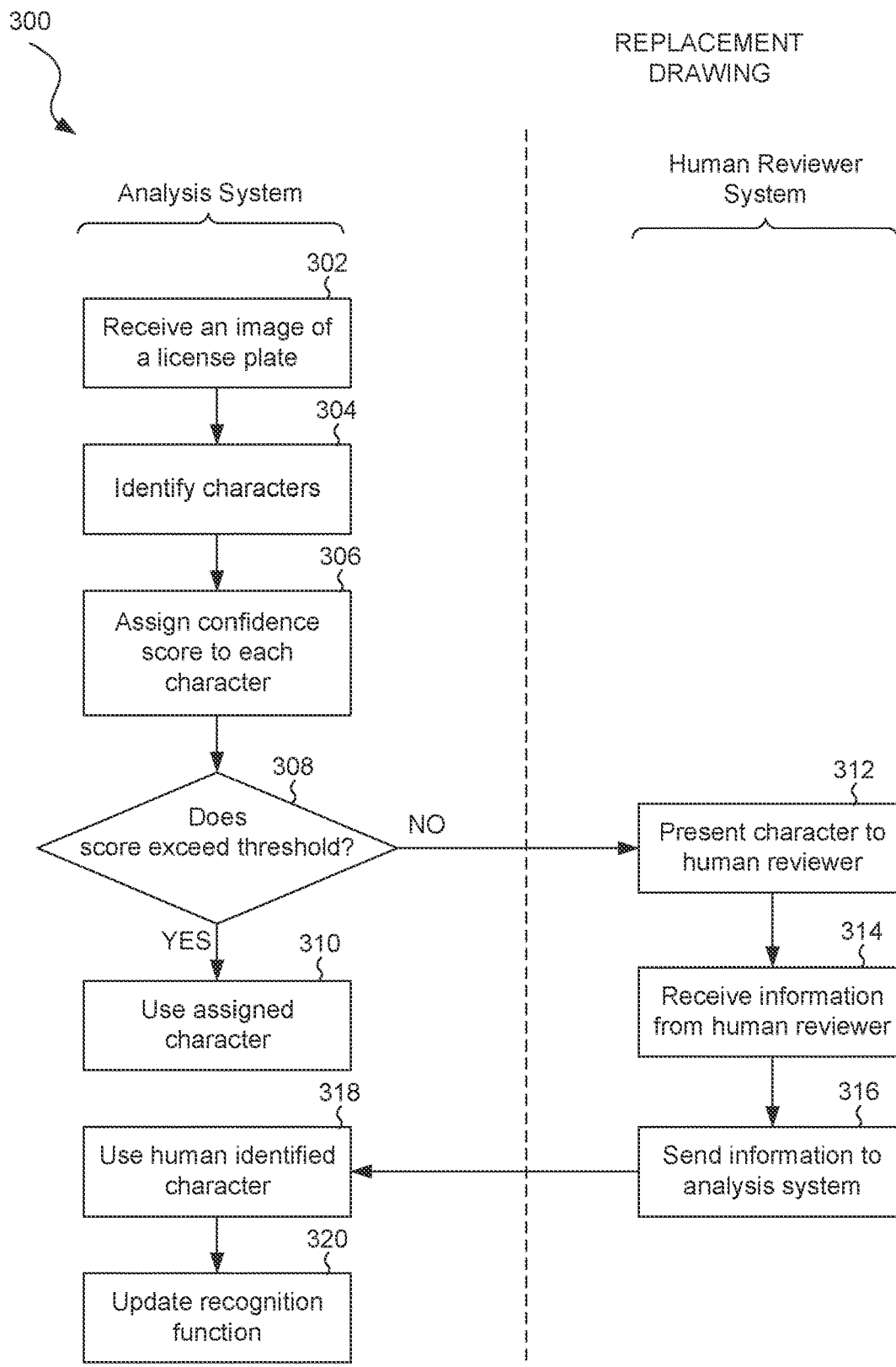
FIG. 3 is a flowchart showing an illustrative method for gamified alphanumeric character identification, according to one example of principles described herein.

FIG. 3 is a flowchart showing an illustrative method 300 for gamified alphanumeric character identification. According to the present example, the flowchart shows actions performed by both the analysis system (e.g., 104, FIG. 1)

and the human reviewer system (e.g., 108, FIG. 1). At action 302, the system receives an image of a license plate. The image may be received by an image detection system such as a camera system set up on a tollway. Other types of images for character recognition may be used with the principles described herein as well.

At action 304, the system identifies the characters within the image. Ideally, each of the characters within the image are able to be appropriately identified. However, there may be cases where the character identification function, such as an optical character recognition (OCR) function, is not able to confidently identify a character. At action 306, the system assigns a confidence value to each identified character.

At action 308, the system determines whether the assigned confidence value exceeds a threshold. If the confidence value for a particular identified character does indeed exceed the threshold, then the process proceeds to action 310, at which the system designates a character using the character identified by the OCR function. If, however, the confidence score does not exceed the threshold, then the analysis system sends the character to the human reviewer system. In some examples, the analysis system sends only the part of the image that includes the character with the low confidence score. In some examples, the analysis system sends the entire image, along with metadata that identifies which character (or characters) had the low confidence score(s).

At action 312, the human reviewer system presents the character to a human reviewer. This may be done through a graphical user interface such as the one described in FIGS. 2A and 2B. In some examples, the entire image is displayed, with non-relevant characters obstructed or blurred. In some examples, only the relevant image is displayed.

At action 314, the human reviewer system receives information from the human reviewer. This information includes a character identification of the displayed character from a human user. This may be received through one of a variety of input mechanisms, such as a keyboard, mouse, touchscreen, or microphone and voice-to-text software. The information also includes a reason from the user as to why the user believes the character received a low confidence score. This reason may be one of a set of preset reasons, such as the character being at least partially obstructed, the character being too light with respect to the background, the character being too dark with respect to the background, or other reasons that may cause a character to be difficult to read.

At action 316, the human reviewer system sends the information received from the human user back to the analysis system. This information includes both the character identifications made by the user as well as any feedback provided by the user as to why a character had a low confidence score or was unreadable.

At action 318, the analysis designates the character identified by the human user as the character in a particular image. In some examples, the analysis system may designate the character identified by a majority of users, if different users gave different responses for the same character. At action 320, the analysis system updates the image recognition function (e.g., 106, FIG. 1) based on the responses provided by the user. For example, the analysis system may utilize machine learning and data processing techniques to tune the function for better performance. Machine learning involves presenting a system with a series of inputs and outputs to develop a model that defines the relationship between the inputs and outputs. By providing more inputs (difficult to recognize images) and outputs (user responses), the model can be further developed to better recognize difficult characters and achieve higher confidence scores for those characters.

Figure 4:
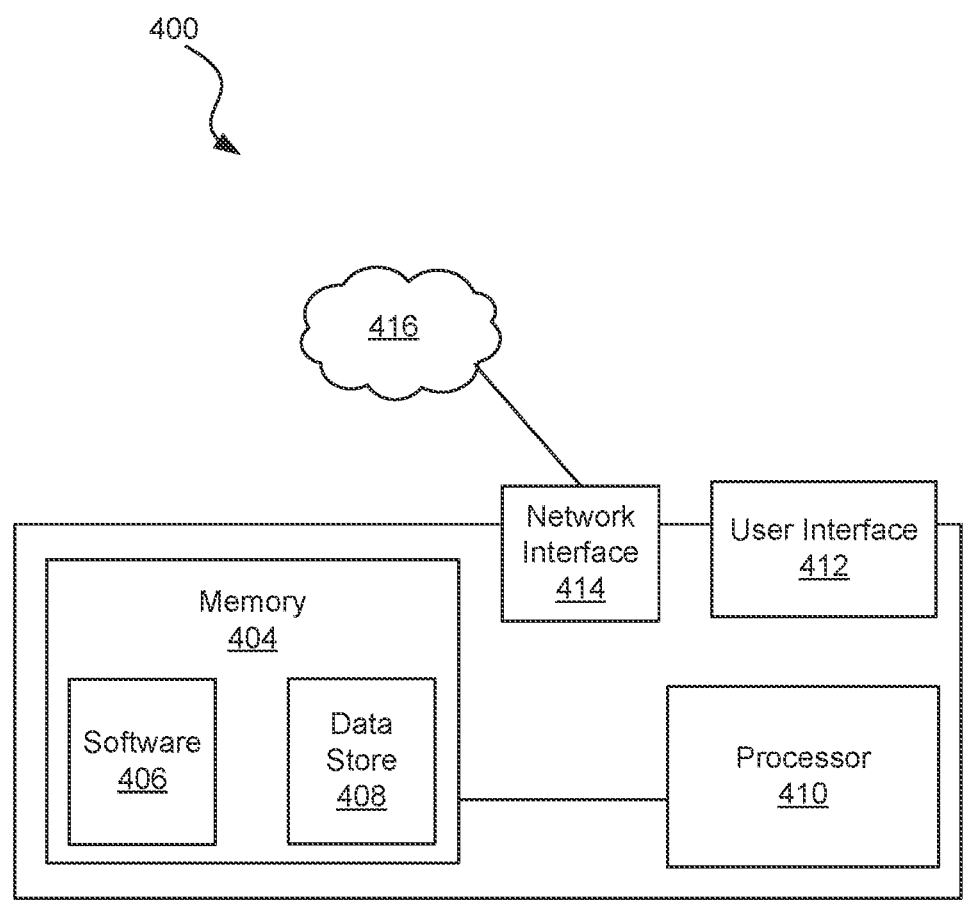
FIG. 4 is a diagram showing an illustrative computing system that may be used for gamified alphanumeric character identification, according to one example of principles described herein.

FIG. 4 is a diagram showing an illustrative computing system that may be used for gamified alphanumeric character identification, according to one example of principles described herein. For example, the computing system 400 may be used to perform the functions associated with either the analysis system 102 or the human reviewer system 104. Other functions described herein may also be performed by computing systems such as computing system 400. According to certain illustrative examples, the computing system 400 includes a memory 404 which may include software 406 and a data store 408. The processing system 400 also includes a processor 410, a network interface 414, and a user interface 412.

The memory 404 may be one of several different types of memory. Some types of memory, such as solid-state drives, are designed for storage. These types of memory typically have large storage volume but relatively slow performance. Other types of memory, such as those used for Random Access Memory (RAM), are optimized for speed and are often referred to as "working memory." The various types of memory may store information in the form of software 406 and data in the data store 408.

The computing system 400 also includes a processor 410 for executing the software 406 and using or updating the data 408 stored in memory 404. The software 406 may include an operating system and any other software applications a user may wish to install. In some examples, the computing system 400 may be associated with a user. The software 406 may be an application such as the image analysis function 106 or the gamified human reviewer application 110. The software 406 may include machine readable instructions of a computer program product that when executed, perform the functions described above.

The user interface 412 may include a number of input devices such as a mouse, touchpad, or touchscreen that allow the user to interact with the computing system 400. The user interface 412 may also include a number of different types of output devices such as a monitor or a touchscreen. The user interface allows the user to interact with the processing system 400 in a manner as described above.

The network interface 414 may include hardware and software that allows the processing system 400 to communicate with other processing systems over a network 416. The network interface 414 may be designed to communicate with the network 416 through hardwire media such as Ethernet, coaxial, fiber-optic, etc. The network interface 414 may also be designed to communicate with the network 416 using wireless technologies.

Some examples of processing systems described herein may include non-transitory, tangible, machine readable media that include executable code that when run by one or more processors may cause the one or more processors to perform the processes of methods as described above. Some common forms of machine-readable media that may include the processes of methods are, for example, floppy disk, flexible disk, hard disk, magnetic tape, any other magnetic medium, CD-ROM, any other optical medium, RAM, PROM, EPROM, FLASH-EPROM, any other memory chip or cartridge, and/or any other medium from which a processor or computer is adapted to read.

Some examples of processing systems described herein may include non-transitory, tangible, machine readable media that include executable code that when run by one or more processors may cause the one or more processors to perform the processes of methods as described above. Some common forms of machine-readable media that may include the processes of methods are, for example, floppy disk, flexible disk, hard disk, magnetic tape, any other magnetic medium, CD-ROM, any other optical medium, RAM, PROM, EPROM, FLASH-EPROM, any other memory chip or cartridge, and/or any other medium from which a processor or computer is adapted to read.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method performed by a computing system, the method comprising:
   receiving from a first detection system, an image of a license plate;
   applying an optical recognition function to characters of the license plate;
   assigning a confidence value to each of the characters;
   in response to determining that the confidence value for a particular character is below a threshold, sending an image of the character to a gamified human reviewer application;
   receiving from the gamified human reviewer application, a human response indicative of a characteristic of the character; and
   updating the optical recognition function based on the characteristic of the character,
   wherein the characteristic includes at least one of: the character being darker than a background, the character being lighter than the background, and the character being blurry, or the character being at least partially obstructed.

2. The method of claim 1, wherein the characteristic comprises the character being darker than the background.

3. The method of claim 1, wherein the characteristic comprises the character being lighter than the background.

4. The method of claim 1, wherein the characteristic comprises the character being blurry.

5. The method of claim 1, wherein the character is at least partially obstructed.

6. The method of claim 1, further comprising, with the gamified human reviewer application, presenting the character within a personalized graphical user interface.

7. The method of claim 6, further comprising, displaying to a user through the graphical user interface, a score associated with a user's recognition of multiple characters.

8. The method of claim 6, further comprising, displaying to a user through the graphical user interface, scores associated with other user's recognition of multiple characters.

9. The method of claim 1, further comprising, with the gamified human reviewer application, receiving the human response indicative of the characteristic of the character through voice.

10. The method of claim 1, further comprising, with the gamified human reviewer application, presenting to a user, multiple characters from different license plates simultaneously.

11. A method comprising:
    receiving a plurality of character images from a license plate recognition system, each character image comprising a single character from an image of a license plate;
    presenting the plurality of character images to a user in a gamified manner;
    presenting the user with information regarding a user's performance of identifying characters from the plurality of character images;
    receiving from the user, an identification of the characters and characteristics of the characters, where the characteristics of the characters include at least one of: one of the characters being darker than the background, one of the characters being lighter than the background, one of the characters being blurry, and one of the characters being at least partially obstructed; and
    returning the identification and the characteristics to the license plate recognition system.

12. The method of claim 11, further comprising, displaying to the user a score associated with a user's recognition of multiple characters.

13. The method of claim 11, further comprising, displaying to the user scores associated with other user's recognition of multiple characters.

14. The method of claim 11, further comprising, receiving the identification of the characters and the characteristics of the characters through voice.

15. The method of claim 11, further comprising, displaying multiple characters from different license plates simultaneously to the user.

16. The method of claim 11, wherein the characteristics comprise the characters being at least partially obstructed.

17. A system comprising:
    a processor; and
    a memory comprising machine readable instructions that when executed by a processor, cause the system to:
    receive from a detection system, an image of a license plate;
    apply an optical recognition function to characters of the license plate;
    assign a confidence value to each of the characters;
    in response to determining that the confidence value for a particular character is below a threshold, send an image of the character to a gamified human reviewer application;
    receive from the gamified human reviewer application, a human response indicative of a characteristic of the character;
    and update the optical recognition function based on the characteristic of the character,
    wherein the characteristic comprises at least one of: the character being darker than the background, the character being lighter than the background, the character being blurry, and the character being at least partially obstructed.

18. The system of claim 17, wherein the system further uses an updated version of the optical recognition function to recognize a subsequent character.

19. The system of claim 17, wherein the system is configured to display to a user a score associated with a user's recognition of multiple characters.

20. The system of claim 18, wherein the system is configured to display to a user a score associated with other user's recognition of multiple characters.

* * * * *